(12) United States Patent
König et al.

(10) Patent No.: US 9,388,341 B2
(45) Date of Patent: Jul. 12, 2016

(54) PALE-COLORED FLAME-RETARDANT POLYAMIDES

(71) Applicant: BASF SE, Ludwigshafen (DE)

(72) Inventors: Alexander König, Bruchsal (DE); Torsten Erdmann, Bad Blankenburg (DE); Michael Roth, Lautertal (DE); Klaus Uske, Bad Dürkheim (DE); Jochen Engelmann, Neustadt (DE); Axel Ebenau, Schifferstadt (DE); Martin Klatt, Mannheim (DE)

(73) Assignee: BASF SE (DE)

( * ) Notice: Subject to any disclaimer, the term of this patent is extended or adjusted under 35 U.S.C. 154(b) by 318 days.

(21) Appl. No.: 13/847,511

(22) Filed: Mar. 20, 2013

(65) Prior Publication Data

US 2013/0248782 A1 Sep. 26, 2013

Related U.S. Application Data

(60) Provisional application No. 61/613,500, filed on Mar. 21, 2012.

(51) Int. Cl.
| | |
|---|---|
| C09K 21/14 | (2006.01) |
| C08K 5/3492 | (2006.01) |
| C08L 77/00 | (2006.01) |
| B01F 3/12 | (2006.01) |
| B01F 7/16 | (2006.01) |

(52) U.S. Cl.
CPC ............. *C09K 21/14* (2013.01); *B01F 3/1221* (2013.01); *B01F 7/164* (2013.01); *C08K 5/34928* (2013.01); *C08L 77/00* (2013.01)

(58) Field of Classification Search
None
See application file for complete search history.

(56) References Cited

U.S. PATENT DOCUMENTS

| | | | |
|---|---|---|---|
| 4,314,927 A | 2/1982 | Theysohn et al. | |
| 2006/0047057 A1 | 3/2006 | Plachetta et al. | |
| 2008/0255279 A1 | 10/2008 | Neuhaus et al. | |
| 2014/0179849 A1* | 6/2014 | Aepli | C08G 69/14 524/420 |
| 2014/0179850 A1* | 6/2014 | Aepli | C08G 69/14 524/420 |
| 2014/0179851 A1* | 6/2014 | Pfleghar | C08L 77/06 524/420 |
| 2014/0336313 A1* | 11/2014 | Menozzi | C08K 5/34926 524/100 |

FOREIGN PATENT DOCUMENTS

| | | |
|---|---|---|
| EP | 0019768 A1 | 12/1980 |
| EP | 0255901 A2 | 2/1988 |
| WO | WO-2004037908 A1 | 5/2004 |
| WO | WO-2007042446 A1 | 4/2007 |

OTHER PUBLICATIONS

European Search Report for EP 1260483.9, dated Sep. 19, 2012.

* cited by examiner

*Primary Examiner* — Joseph D Anthony
(74) *Attorney, Agent, or Firm* — Drinker Biddle & Reath LLP

(57) ABSTRACT

Thermoplastic molding compositions comprising
A) from 10 to 98% by weight of a thermoplastic polyamide,
B) from 0.1 to 60% by weight of red phosphorus,
C) from 0.5 to 20% by weight of a melamine compound,
D) from 1 to 30% by weight of titanium dioxide in the rutile form,
E) from 0 to 40% by weight of an impact modifier, and
F) from 0 to 60% by weight of further additives,
where the sum of the percentages by weight of components A) to F) is 100%.

12 Claims, No Drawings

PALE-COLORED FLAME-RETARDANT POLYAMIDES

CROSS-REFERENCE TO RELATED APPLICATIONS

This application claims the benefit of U.S. Provisional Application No. 61/613,500, filed Mar. 21, 2012, which is incorporated herein by reference.

The invention relates to thermoplastic molding compositions comprising
A) from 10 to 98% by weight of a thermoplastic polyamide,
B) from 0.1 to 60% by weight of red phosphorus,
C) from 0.5 to 20% by weight of a melamine compound,
D) from 1 to 30% by weight of titanium dioxide in the rutile form,
E) from 0 to 40% by weight of an impact modifier, and
F) from 0 to 60% by weight of further additives,
where the sum of the percentages by weight of components A) to F) is 100%.

The present invention further relates to molding compositions of this type for producing fibers, foils, and moldings, and to the resultant moldings, fibers, and foils of any type.

It is known that addition of red phosphorus to thermoplastics, especially to reinforced or filled polyamides, provides effective fire protection (DE-A 1931387, DE-A 2703052, DE-A 19648503, EP-A 71788, EP-A 384232, EP-A 1626066 and WO2007/042446). However, under unfavorable conditions, e.g. elevated temperature, moisture, presence of alkali or oxygen, red phosphorus tends to form decomposition products, such as phosphine and acids of mono- to pentavalent phosphorus. Red phosphorus incorporated in thermoplastics, e.g. in polyamides, mostly has substantial protection from thermooxidation as a consequence of embedding into the polymer.

Another disadvantage of phosphorus-containing polyamides is a tendency toward red to brown color. However, addition of white pigments impairs flame-retardant action, in particular the tendency toward formation of drops after oven-aging in the fire test.

It was therefore an object of the present invention to provide flame-retardant molding compositions which have a pale intrinsic color and exhibit improved flame retardancy (as far as possible without any flaming drops).

The molding compositions defined in the introduction have accordingly been found. The dependent claims give preferred embodiments.

The molding compositions of the invention comprise, as component A), from 10 to 98% by weight, preferably from 20 to 96% by weight, and in particular from 30 to 88% by weight, of at least one polyamide.

The polyamides of the molding compositions of the invention generally have an intrinsic viscosity of from 90 to 350 ml/g, preferably from 110 to 240 ml/g, determined in a 0.5% strength by weight solution in 96% strength by weight sulfuric acid at 25° C. to ISO 307.

Preference is given to semicrystalline or amorphous resins with a molecular weight (weight average) of at least 5 000, described by way of example in the following U.S. Pat. Nos. 2,071,250, 2,071,251, 2,130,523, 2,130,948, 2,241,322, 2,312,966, 2,512,606, and 3,393,210.

Examples of these are polyamides that derive from lactams having from 7 to 13 ring members, e.g. polycaprolactam, polycaprylolactam, and polylaurolactam, and also polyamides obtained via reaction of dicarboxylic acids with diamines.

Dicarboxylic acids which may be used are alkanedicarboxylic acids having 6 to 12, in particular 6 to 10, carbon atoms, and aromatic dicarboxylic acids. Merely as examples, those that may be mentioned here are adipic acid, azelaic acid, sebacic acid, dodecanedioic acid and terephthalic and/or isophthalic acid.

Particularly suitable diamines are alkanediamines having from 6 to 12, in particular from 6 to 8, carbon atoms, and also m-xylylenediamine (e.g. Ultramid® X17 from BASF SE, where the molar ratio of MXDA to adipic acid is 1:1), di(4-aminophenyl)methane, di(4-aminocyclohexyl)methane, 2,2-di(4-aminophenyl)propane, 2,2-di(4-aminocyclohexyl)propane, and 1,5-diamino-2-methylpentane.

Preferred polyamides are polyhexamethyleneadipamide, polyhexamethylenesebacamide, and polycaprolactam, and also nylon-6/6,6 copolyamides, in particular having a proportion of from 5 to 95% by weight of caprolactam units (e.g. Ultramid® C31 from BASF SE). Other suitable polyamides are obtainable from ω-aminoalkylnitriles, e.g. aminocapronitrile (PA 6) and adipodinitrile with hexamethylenediamine (PA 66) via what is known as direct polymerization in the presence of water, for example as described in DE-A 10313681, EP-A 1198491 and EP 922065.

Mention may also be made of polyamides obtainable, by way of example, via condensation of 1,4-diaminobutane with adipic acid at an elevated temperature (nylon-4,6). Preparation processes for polyamides of this structure are described by way of example in EP-A 38 094, EP-A 38 582, and EP-A 39 524.

Other suitable examples are polyamides obtainable via copolymerization of two or more of the abovementioned monomers, and mixtures of two or more polyamides in any desired mixing ratio. Particular preference is given to mixtures of nylon-6,6 with other polyamides, in particular nylon-6/6,6 copolyamides.

Other copolyamides which have proven particularly advantageous are semiaromatic copolyamides, such as PA 6/6T and PA 66/6T, where the triamine content of these is less than 0.5% by weight, preferably less than 0.3% by weight (see EP-A 299 444). Other polyamides resistant to high temperatures are known from EP-A 19 94 075 (PA 6T/6I/MXD6).

The processes described in EP-A 129 195 and 129 196 can be used to prepare the preferred semiaromatic copolyamides with low triamine content.

The following list, which is not comprehensive, comprises the polyamides A) mentioned and other polyamides A) for the purposes of the invention, and the monomers comprised:

| AB polymers: | |
| --- | --- |
| PA 4 | Pyrrolidone |
| PA 6 | ε-Caprolactam |
| PA 7 | Ethanolactam |
| PA 8 | Caprylolactam |
| PA 9 | 9-Aminopelargonic acid |
| PA 11 | 11-Aminoundecanoic acid |
| PA 12 | Laurolactam |
| AA/BB polymers: | |
| PA 46 | Tetramethylenediamine, adipic acid |
| PA 66 | Hexamethylenediamine, adipic acid |
| PA 69 | Hexamethylenediamine, azelaic acid |
| PA 610 | Hexamethylenediamine, sebacic acid |
| PA 612 | Hexamethylenediamine, decanedicarboxylic acid |
| PA 613 | Hexamethylenediamine, undecanedicarboxylic acid |
| PA 1212 | 1,12-Dodecanediamine, decanedicarboxylic acid |
| PA 1313 | 1,13-Diaminotridecane, undecanedicarboxylic acid |
| PA 6T | Hexamethylenediamine, terephthalic acid |

| | |
|---|---|
| PA 9T | 1,9-nonanediamine, terephthalic acid |
| PA MXD6 | m-Xylylenediamine, adipic acid |
| PA 6I | Hexamethylenediamine, isophthalic acid |
| PA 6-3-T | Trimethylhexamethylenediamine, terephthalic acid |
| PA 6/6T | (see PA 6 and PA 6T) |
| PA 6/66 | (see PA 6 and PA 66) |
| PA 6/12 | (see PA 6 and PA 12) |
| PA 66/6/610 | (see PA 66, PA 6 and PA 610) |
| PA 6I/6T | (see PA 6I and PA 6T) |
| PA PACM 12 | Diaminodicyclohexylmethane, laurolactam |
| PA 6I/6T/PACM | as PA 6I/6T + diaminodicyclohexylmethane |
| PA 12/MACMI | Laurolactam, dimethyldiaminodicyclohexylmethane, isophthalic acid |
| PA 12/MACMT | Laurolactam, dimethyldiaminodicyclohexylmethane, terephthalic acid |
| PA PDA-T | Phenylenediamine, terephthalic acid |

Flame retardant B) of the invention is elemental red phosphorus, in particular in combination with glassfiber-reinforced molding compositions; it can be used in untreated form.

However, particularly suitable preparations are those in which the phosphorus has been surface-coated with low-molecular-weight liquid substances, such as silicone oil, paraffin oil, or esters of phthalic acid (in particular dioctyl phthalate, see EP 176 836) or adipic acid, or with polymeric or oligomeric compounds, e.g. with phenolic resins or amino plastics, or else with polyurethanes (see EP-A 384 232, DE-A 196 48 503). The amounts comprised of these "phlegmatizing agents" are generally from 0.05 to 5% by weight, based on 100% by weight of B).

Concentrates of red phosphorus, e.g. in a polyamide or elastomer, are moreover suitable as flame retardants. In particular, polyolefinhomo- and copolymers are suitable as concentrate polymers. However, unless polyamide is used as thermoplastic, the proportion of the concentrate polymer should not amount to more than 35% by weight, based on the weight of components A) and B) in the molding compositions of the invention.

Preferred concentrate compositions are $B_1$) from 30 to 90% by weight, preferably from 45 to 70% by weight, of a polyamide or elastomer, and $B_2$) from 10 to 70% by weight, preferably from 30 to 55% by weight, of red phosphorus.

The polyamide used for the masterbatch can differ from A) or preferably can be the same as A), in order to avoid any incompatibility or melting point difference having an adverse effect on the molding composition.

The average particle size (d50) of the phosphorus particles dispersed in the molding compositions is preferably in the range from 0.0001 to 0.5 mm; in particular from 0.001 to 0.2 mm.

The content of component B) in the molding compositions of the invention is from 0.1 to 60% by weight, preferably from 0.5 to 40% by weight, and in particular from 1 to 15% by weight, based on the entirety of components A) to F).

The thermoplastic molding compositions of the invention comprise, as component C), from 0.5 to 20% by weight, preferably from 1 to 20% by weight, and in particular from 5 to 15% by weight, of a melamine compound.

Melamine cyanurate is preferably suitable (component C) in the invention and is a reaction product of preferably equimolar amounts of melamine (formula I) and cyanuric or isocyanuric acid (formulae Ia and Ib).

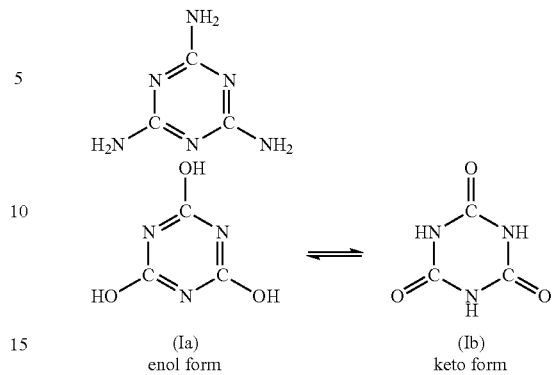

(Ia) enol form  (Ib) keto form

It is obtained by way of example through reaction of aqueous solutions of the starting compounds at from 90 to 100° C. The product available commercially is a white powder with average d50 grain size from 1.5 to 7 μm.

Other suitable compounds (often also termed salts or adducts) are melamine, melamine borate, melamine oxalate, melamine phosphate prim., melamine phosphate sec., and melamine pyrophosphate sec., melamine neopentyl glycol borate, and polymeric melamine phosphate (CAS No. 56386-64-2).

Melamine polyphosphate is in particular preferred and is obtainable with trademark Melapur® from BASF SE. Preferred phosphorus content is from 10 to 15%, in particular from 12 to 14%, and water content is preferably below 0.3%, density being from 1.83 to 1.86 g/cm³.

Preference is given to melamine polyphosphate salts derived from a 1,3,5-triazine compound of which the number n for the average degree of condensation is from 20 to 200, and 1,3,5-triazine content, per mole of phosphorus atom, is from 1.1 to 2.0 mol of a 1,3,5-triazine compound selected from the group consisting of melamine, melam, melem, melon, ammeline, ammelide, 2-ureidomelamine, acetoguanamine, benzoguanamine, and diaminophenyltriazine. It is preferable that the n value for salts of this type is generally from 40 to 150 and that the 1,3,5-triazine compound:mole of phosphorus atom ratio is from 1.2 to 1.8. The pH of a 10% by weight aqueous slurry of salts, produced as in EP1095030B1, is moreover generally more than 4.5, and preferably at least 5.0. The pH is usually determined by adding 25 g of the salt and 225 g of water at 25° C. to a 300 ml beaker, stirring the resultant aqueous slurry for 30 minutes and then measuring the pH. The abovementioned n value, the number-average degree of condensation, can be determined by means of $^{31}P$ solid-state NMR. J. R. van Wazer, C. F. Callis, J. Shoolery, and R. Jones, J. Am. Chem. Soc., 78, 5715, 1956, disclose that there is a unique type of chemical shift that reveals the number of adjacent phosphate groups and permits clear differentiation between orthophosphates, pyrophosphates, and polyphosphates. EP1095030B1 moreover describes a process which can produce the desired polyphosphate salt of a 1,3,5-triazine compound which has an n value of from 20 to 200 and has from 1.1 to 2.0 mol content of a 1,3,5-triazine compound. Said process comprises the conversion of a 1,3,5-triazine compound into its orthophosphate salt by orthophosphoric acid, with subsequent dehydration and heat treatment, in order to convert the orthophosphate salt into a polyphosphate of the 1,3,5-triazine compound. Said heat treatment is preferably carried out at a temperature of at least 300° C., and preferably at at least 310° C. In addition to orthophosphates of 1,3,5-triazine compounds it is equally possible to use other 1,3,5-triazine phosphates, inclusive by way of example of a mixture of orthophosphates and pyrophosphates.

Other melamine derivatives that may be mentioned, and which can equally be used, are the melamine condensates melam, melem, and melon, and carbonitrides.

The molding compositions of the invention comprise, as component D), from 1 to 30% by weight, preferably from 1 to 25% by weight, and in particular from 10 to 20% by weight, of titanium dioxide in the rutile form. Römpp Online, version 3.12 (March 2002) says that rutile form means the "rutile lattice", meaning that the crystal class is ditetragonal dipyramidal, crystal class 4/mmm-$D_{4h}$. The [$TiO_6$] octahedrons therefore have shared edges connecting them to give chains parallel to the C axis.

Preferred forms of $TiO_2$ exhibit an uneven surface, i.e. the surface exhibits a lack of smoothness measurable by means of scanning electron microscopy with magnification 300:1, 1500:1, 5000:1, 20 000:1, or 50 000:1 at 5 kV.

Inclusions of other metals into the crystal system, for example Fe, Nb, Ta, Cr, V, Al, or Zr, generally give a titanium content of from 94 to 98%.

The refractive index n is preferably 2.75 in accordance with DIN 51423.

BET surface area (in accordance with DIN ISO 9277) is preferably at least 5 $m^2$/g, in particular at least 6 $m^2$/g.

Langmuir surface area (maximum loading of sorption areas) is preferably at least 14 $m^2$/g, in particular from 14 to 18 $m^2$/g, in accordance with DIN 66131 and 66134.

The molding compositions comprise, as component E), amounts of from 0 to 40% by weight, preferably from 1 to 30% by weight, in particular from 5 to 20% by weight, of elastomeric polymers (often also termed impact modifiers, elastomers, or rubbers).

These materials very generally involve copolymers, preferably composed of at least two of the following monomers: ethylene, propylene, butadiene, isobutene, isoprene, chloroprene, vinyl acetate, styrene, acrylonitrile, and (meth)acrylates having from 1 to 18 carbon atoms in the alcohol component.

Polymers of this type are described by way of example in Houben-Weyl, Methoden der organischen Chemie, volume 14/1 (Georg-Thieme-Verlag, Stuttgart, 1961), pp 392 to 406, and in the monograph "Toughened Plastics" by C. B. Bucknall (Applied Science Publishers, London, 1977).

Some preferred types of these elastomers are described below.

Preferred types of these elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[$5.2.1.0^{2,6}$]-3,8-decadiene, and mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM rubbers and EPDM rubbers may preferably also have been grafted with reactive carboxylic acids or with derivatives of these. Examples of these are acrylic acid, methacrylic acid and derivatives thereof, e.g. glycidyl(meth)acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These monomers comprising dicarboxylic acid derivatives or comprising epoxy groups are preferably incorporated into the rubber by adding to the monomer mixture monomers comprising dicarboxylic acid groups and/or epoxy groups and having the general formulae I or II or III or IV

where $R^1$ to $R^9$ are hydrogen or alkyl groups having from 1 to 6 carbon atoms, and m is a whole number from 0 to 20, g is a whole number from 0 to 10 and p is a whole number from 0 to 5.

The radicals $R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates comprising epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers comprising epoxy groups and/or methacrylic acid and/or monomers comprising anhydride groups, the remaining amount being (meth)acrylates.

Particular preference is given to copolymers composed of
from 50 to 98% by weight, in particular from 55 to 95% by weight, of ethylene,
from 0.1 to 40% by weight, in particular from 0.3 to 20% by weight, of glycidyl acrylate and/or glycidyl methacrylate, (meth)acrylic acid and/or maleic anhydride, and
from 1 to 45% by weight, in particular from 5 to 40% by weight, of n-butyl acrylate and/or 2-ethylhexyl acrylate.

Other preferred (meth)acrylates are the methyl, ethyl, propyl, isobutyl and tert-butyl esters.

Comonomers which may be used alongside these are vinyl esters and vinyl ethers.

The ethylene copolymers described above may be prepared by processes known per se, preferably by random copolymerization at high pressure and elevated temperature. Appropriate processes are well-known.

Other preferred elastomers are emulsion polymers whose preparation is described, for example, in Blackley's monograph "Emulsion Polymerization". The emulsifiers and catalysts which can be used are known per se.

In principle it is possible to use homogeneously structured elastomers or else those with a shell structure. The shell-type structure is determined by the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell composed of a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, carboxy, latent carboxy, amino and amide groups, and also functional groups which may be introduced by concomitant use of monomers of the general formula

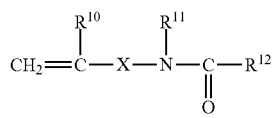

where the substituents can be defined as follows:
$R^{10}$ is hydrogen or a $C_1$-$C_4$-alkyl group,
$R^{11}$ is hydrogen, a $C_1$-$C_8$-alkyl group or an aryl group, in particular phenyl,
$R^{12}$ is hydrogen, a $C_1$-$C_{10}$-alkyl group, a $C_6$-$C_{12}$-aryl group, or —$OR^{13}$,
$R^{13}$ is a $C_1$-$C_8$-alkyl group or a $C_6$-$C_{12}$-aryl group, which can optionally have substitution by groups that comprise O or by groups that comprise N,
X is a chemical bond, a $C_1$-$C_{10}$-alkylene group, or a $C_6$-$C_{12}$-arylene group, or

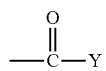

Y is O—Z or NH—Z, and
Z is a $C_1$-$C_{10}$-alkylene or $C_6$-$C_{12}$-arylene group.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase applied by grafting has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
|---|---|---|
| I | 1,3-butadiene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope composed of monomers as described under I and II for the core, second envelope as described under I or IV for the envelope |

Instead of graft polymers whose structure has more than one shell, it is also possible to use homogeneous, i.e. single-shell, elastomers composed of 1,3-butadiene, isoprene and n-butyl acrylate or of copolymers of these. These products, too, may be prepared by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core composed of n-butyl acrylate or based on butadiene and with an outer envelope composed of the abovementioned copolymers, and copolymers of ethylene with comonomers which supply reactive groups.

The elastomers described may also be prepared by other conventional processes, e.g. by suspension polymerization.

Preference is also given to silicone rubbers, as described in DE-A 37 25 576, EP-A 235 690, DE-A 38 00 603 and EP-A 319 290.

Particularly preferred rubbers E) are ethylene copolymers as described above which comprise functional monomers, where the functional monomers are those selected from the group of the carboxylic acid, carboxylic anhydride, carboxylic ester, carboxamide, carboximide, amino, hydroxy, epoxy, urethane, or oxazoline groups, or a mixture of these.

The content of the functional groups is from 0.1 to 20% by weight, preferably from 0.2 to 10% by weight, and in particular from 0.3 to 7% by weight, based on 100% by weight of E).

Particularly preferred monomers are those composed of an ethylenically unsaturated mono- or dicarboxylic acid or of a functional derivative of such an acid.

In principle, any of the primary, secondary, or tertiary $C_1$-$C_{18}$-alkyl(meth)acrylates is suitable, but preference is given to esters having from 1 to 12 carbon atoms, in particular having from 2 to 10 carbon atoms.

Examples here are methyl, ethyl, propyl, n-butyl, isobutyl and tert-butyl, 2-ethylhexyl, octyl and decyl acrylates, and the corresponding meth acrylates. Among these, particular preference is given to n-butyl acrylate and 2-ethylhexyl acrylate.

The olefin polymers can also comprise, instead of the esters, or in addition to these, acid-functional and/or latently acid-functional monomers of ethylenically unsaturated mono- or dicarboxylic acids, or monomers having epoxy groups.

Other examples of monomers that may be mentioned are acrylic acid, methacrylic acid, tertiary alkyl esters of these acids, in particular tert-butyl acrylate, and dicarboxylic acids, such as maleic acid and fumaric acid, and derivatives of said acids, and also monoesters of these.

Latently acid-functional monomers are compounds which under the conditions of polymerization or during incorporation of the olefin polymers into the molding compositions, form free acid groups. Examples that may be mentioned here are anhydrides of dicarboxylic acids having up to 20 carbon atoms, in particular maleic anhydride, and tertiary $C_1$-$C_{12}$-alkyl esters of the abovementioned acids, in particular tert-butyl acrylate and tert-butyl methacrylate.

The acid-functional or latently acid-functional monomers and the monomers comprising epoxy groups are preferably incorporated into the olefin polymers through addition of compounds of the general formulae I-IV to the monomer mixture.

The melt index of the ethylene copolymers is generally in the range from 1 to 80 g/10 min (measured at 190° C. with 2.16 kg load).

The molar mass of said ethylene-α-olefin copolymers is from 10 000 to 500 000 g/mol, preferably from 15 000 to 400 000 g/mol (Mn, determined by means of GPC in 1,2,4-trichloro-benzene with PS calibration).

One particular embodiment uses ethylene-α-olefin copolymers produced by means of "single site catalysts". Further details can be found in U.S. Pat. No. 5,272,236. In this case, the ethylene-α-olefin copolymers have a molecular weight distribution which is narrow for polyolefins: smaller than 4, and preferably smaller than 3.5.

Preferred commercially available products B used are Exxelor® VA 1801, or 1803, Kraton® G 1901 FX, or Fusabond® N NM493 D, or Fusabond® A560 from Exxon, Kraton, and DuPont, and also Tafmer® MH 7010 from Mitsui.

It is also possible, of course, to use a mixture of the types of rubber listed above.

The molding compositions of the invention can comprise, as component F), up to 60% by weight, preferably up to 50% by weight, of further additives.

Fibrous or particulate fillers F) (other than D)) that may be mentioned are carbon fibers, glass fibers, glass beads, amorphous silica, calcium silicate, calcium metasilicate, magnesium carbonate, kaolin, chalk, powdered quartz, mica, barium sulfate, and feldspar, and the amounts of these that can be used are from 1 to 50% by weight, in particular from 5 to 40% by weight, preferably from 10 to 40% by weight.

Preferred fibrous fillers that may be mentioned are carbon fibers, aramid fibers, and potassium titanate fibers, particular preference being given to glass fibers in the form of E glass. These can be used as rovings or in the commercially available forms of chopped glass.

The fibrous fillers may have been surface-pretreated with a silane compound to improve compatibility with the thermoplastics.

Suitable silane compounds have the general formula:

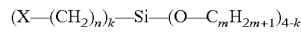

where the definitions of the substituents are as follows:
X is $NH_2$—,

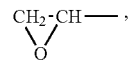

HO—,
n is a whole number from 2 to 10, preferably 3 to 4,
m is a whole number from 1 to 5, preferably 1 to 2, and
k is a whole number from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which comprise a glycidyl group as substituent X.

The amounts of the silane compounds generally used for surface-coating are from 0.01 to 2% by weight, preferably from 0.025 to 1.0% by weight and in particular from 0.05 to 0.5% by weight (based on E)).

Acicular mineral fillers are also suitable.

For the purposes of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may optionally have been pretreated with the abovementioned silane compounds, but the pretreatment is not essential.

Other fillers which may be mentioned are kaolin, calcined kaolin, wollastonite, talc and chalk, and also lamellar or acicular nanofillers, the amounts of these preferably being from 0.1 to 10%. Materials preferred for this purpose are boehmite, bentonite, montmorillonite, vermiculite, hectorite, and laponite. The lamellar nanofillers are organically modified by prior-art methods, to give them good compatibility with the organic binder. Addition of the lamellar or acicular nanofillers to the inventive nanocomposites gives a further increase in mechanical strength.

The molding compositions of the invention can comprise, as component F), from 0.05 to 3% by weight, preferably from 0.1 to 1.5% by weight, and in particular from 0.1 to 1% by weight, of a lubricant.

Preference is given to the salts of Al, of alkali metals, or of alkaline earth metals, or esters or amides of fatty acids having from 10 to 44 carbon atoms, preferably having from 12 to 44 carbon atoms.

The metal ions are preferably alkaline earth metal and Al, particular preference being given to Ca or Mg.

Preferred metal salts are Ca stearate and Ca montanate, and also Al stearate.

It is also possible to use a mixture of various salts, in any desired mixing ratio.

The carboxylic acids can be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols can be monohydric to tetrahydric. Examples of alcohols are n-butanol, n-octanol, stearyl alcohol, ethylene glycol, propylene glycol, neopentyl glycol, pentaerythritol, preference being given to glycerol and pentaerythritol.

The aliphatic amines can be mono- to tribasic. Examples of these are stearylamine, ethylenediamine, propylenediamine, hexamethylenediamine, di(6-aminohexyl)amine, particular preference being given to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use a mixture of various esters or amides, or of esters with amides in combination, in any desired mixing ratio.

The molding compositions of the invention can comprise, as component F), from 0.05 to 3% by weight, preferably from 0.1 to 1.5% by weight, and in particular from 0.1 to 1% by weight, of a copper stabilizer, preferably of a Cu(I) halide, in particular in a mixture with an alkali metal halide, preferably KI, in particular in the ratio 1:4., or of a sterically hindered phenol, or a mixture of these.

Preferred salts of monovalent copper used are copper(I) acetate, copper(I) chloride, copper(I) bromide, and copper(I) iodide. The materials can also comprise phosphine complexes (specifically bistriphenylphosphine copper iodide). The materials comprise these in amounts of from 5 to 500 ppm of copper, preferably from 10 to 250 ppm, based on polyamide.

The advantageous properties are in particular obtained if the copper is present with molecular distribution in the polyamide. This is achieved if a concentrate comprising the polyamide, and comprising a salt of monovalent copper, and comprising an alkali metal halide in the form of a solid, homogeneous solution is added to the molding composition. By way of example, a typical concentrate is composed of from 79 to 95% by weight of polyamide and from 21 to 5% by weight of a mixture composed of copper iodide or copper bromide and potassium iodide. The copper concentration in the solid homogeneous solution is preferably from 0.3 to 3% by weight, in particular from 0.5 to 2% by weight, based on the total weight of the solution, and the molar ratio of copper (I) iodide to potassium iodide is from 1 to 11.5, preferably from 1 to 5.

Suitable polyamides for the concentrate are homopolyamides and copolyamides, in particular nylon-6 and nylon-6,6.

Suitable sterically hindered phenols F) are in principle all of the compounds which have a phenolic structure and which have at least one bulky group on the phenolic ring.

It is preferable to use, for example, compounds of the formula

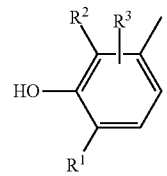

where:
$R^1$ and $R^2$ are an alkyl group, a substituted alkyl group, or a substituted triazole group, and where the radicals $R^1$ and $R^2$ may be identical or different, and $R^3$ is an alkyl group, a substituted alkyl group, an alkoxy group, or a substituted amino group.

Antioxidants of the abovementioned type are described by way of example in DE-A 27 02 661 (U.S. Pat. No. 4,360,617).

Another group of preferred sterically hindered phenols is provided by those derived from substituted benzenecarboxylic acids, in particular from substituted benzenepropionic acids.

Particularly preferred compounds from this class are compounds of the formula

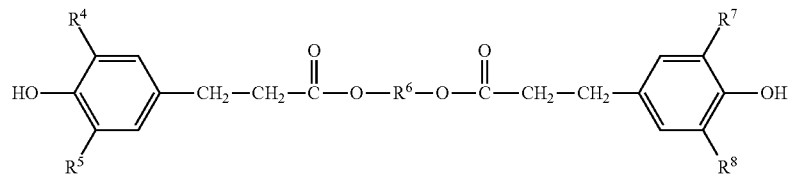

where $R^4$, $R^5$, $R^7$, and $R^8$, independently of one another, are $C_1$-$C_8$-alkyl groups which themselves may have substitution (at least one of these being a bulky group), and $R^6$ is a divalent aliphatic radical which has from 1 to 10 carbon atoms and whose main chain may also have C—O bonds.

Preferred compounds corresponding to this formula are

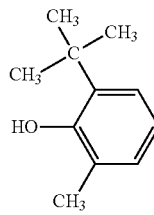 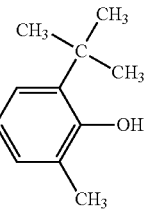

(Irganox® 245 from BASF SE)

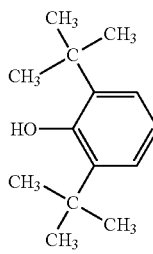 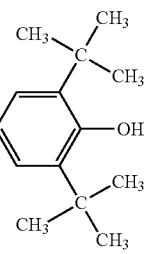

(Irganox® 259 from BASF SE)

All of the following should be mentioned as examples of sterically hindered phenols:

2,2'-methylenebis(4-methyl-6-tert-butylphenol), 1,6-hexanediol bis[3-(3,5-di-tert-butyl-4-hydroxyphenyl)propionate], pentaerythrityl tetrakis[3-(3,5-di-tert-butyl-4-hydroxyphenyl)-propionate], distearyl 3,5-di-tert-butyl-4-hydroxybenzylphosphonate, 2,6,7-trioxa-1-phosphabicyclo[2.2.2]oct-4-ylmethyl 3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxybenzyl)benzene, 4,4'-methylenebis(2,6-di-tert-butylphenol), 3,5-di-tert-butyl-4-hydroxybenzyldimethylamine.

Compounds which have proven particularly effective and which are therefore used with preference are 2,2'-methylenebis(4-methyl-6-tert-butylphenol), 1,6-hexanediol bis(3,5-di-tert-butyl-4-hydroxyphenyl)propionate (Irganox® 259), pentaerythrityl tetrakis[3-(3,5-di-tert-butyl-4-hydroxyphenyl)propionate], and also N,N'-hexamethylenebis-3,5-di-tert-butyl-4-hydroxyhydrocinnamide (Irganox® 1098), and the product Irganox® 245 described above from BASF SE, which has particularly good suitability.

The amount comprised of the antioxidants F), which can be used individually or as a mixture, is from 0.05 up to 3% by weight, preferably from 0.1 to 1.5% by weight, in particular from 0.1 to 1% by weight, based on the total weight of the molding compositions A) to F).

In some instances, sterically hindered phenols having not more than one sterically hindered group in ortho-position with respect to the phenolic hydroxy group have proven particularly advantageous; in particular when assessing colorfastness on storage in diffuse light over prolonged periods.

The molding compositions of the invention can comprise, as component F), from 0.05 to 5% by weight, preferably from 0.1 to 2% by weight, and in particular from 0.25 to 1.5% by weight, of a nigrosin.

Nigrosins are generally a group of black or gray phenazine dyes (azine dyes) related to the indulines and taking various forms (water-soluble, liposoluble, spirit-soluble), used in wool dyeing and wool printing, in black dyeing of silks, and in the coloring of leather, of shoe creams, of varnishes, of plastics, of stoving lacquers, of inks, and the like, and also as microscopy dyes.

Nigrosins are obtained industrially via heating of nitrobenzene, aniline, and aniline hydrochloride with metallic iron and $FeCl_3$ (the name being derived from the Latin niger=black).

Component F) can be used in the form of free base or else in the form of salt (e.g. hydrochloride).

Further details concerning nigrosins can be found by way of example in the electronic encyclopedia Römpp Online, Version 2.8, Thieme-Verlag Stuttgart, 2006, keyword "Nigrosin".

The thermoplastic molding compositions of the invention can comprise, as component F), conventional processing aids, such as stabilizers, oxidation retarders, agents to counteract decomposition by heat and decomposition by ultraviolet light, lubricants and mold-release agents, colorants, such as dyes and pigments, nucleating agents, plasticizers, etc.

Examples of oxidation retarders and heat stabilizers are sterically hindered phenols and/or phosphites and amines (e.g. TAD), hydroquinones, aromatic secondary amines, such as diphenylamines, various substituted members of these groups, and mixtures of these, in concentrations of up to 1% by weight, based on the weight of the thermoplastic molding compositions.

UV stabilizers that may be mentioned, the amounts of which used are generally up to 2% by weight, based on the molding composition, are various substituted resorcinols, salicylates, benzotriazoles, and benzophenones.

Materials that can be added as colorants are inorganic pigments, such as titanium dioxide, ultramarine blue, iron oxide, ZnO, boehmite, AlO(OH), and carbon black, and also organic pigments, such as phthalocyanines, quinacridones, perylenes, and also dyes, such as anthraquinones.

Materials that can be used as nucleating agents are sodium phenylphosphinate, aluminum oxide, silicon dioxide, and also preferably talc powder.

The thermoplastic molding compositions of the invention can be produced by processes known per se, by mixing the starting components in conventional mixing apparatus, such as screw-based extruders, Brabender mixers, or Banbury mixers, and then extruding the same. The extrudate can be cooled and pelletized. It is also possible to premix individual components and then to add the remaining starting materials individually and/or likewise in the form of a mixture. The mixing temperatures are generally from 230 to 320° C.

In another preferred mode of operation, components B) and C) and D), and also optionally F) and E), can be mixed with a prepolymer, compounded and pelletized. The resultant pellets are then solid-phase condensed under inert gas continuously or batchwise at a temperature below the melting point of component A) until the desired viscosity is reached.

The thermoplastic molding compositions of the invention feature good flame retardancy and pale intrinsic color. These materials are therefore suitable for producing fibers, foils, and moldings of any type. Some examples will now be mentioned: plug connectors, plugs, plug parts, cable-harness components, circuit mounts, circuit-mount components, three-dimensionally injection-molded circuit mounts, electrical connectors, and mechatronic components.

The moldings or semifinished products to be produced in the invention from the thermoplastic molding compositions can be used by way of example in the motor vehicle industry, electrical industry, electronics industry, telecommunications industry, information-technology industry, consumer-electronics industry, or computer industry, in vehicles and other means of conveyance, in ships, in spacecraft, in the household, in office equipment, in sports, in medicine, and also generally in articles and parts of buildings which require increased fire protection.

Possible uses of improved-flow polyamides in the kitchen and household sector are for the production of components for kitchen devices, e.g. fryers, smoothing irons, knobs, and also applications in the garden and leisure sector.

EXAMPLES

The following components were used:
Component A:
Nylon-6,6 with intrinsic viscosity IV 150 ml/g, measured on a 0.5% by weight solution in 96% by weight sulfuric acid at 25° C. in accordance with ISO 307. (Ultramid® A24 from BASF SE was used.)
Component B:
Red phosphorus
Component C:
Melamine polyphosphate (Melapur® M200/70 from BASF SE)
Component D:

|  | D1 | D2 | D3 | D/1 comp | D/2 comp |
|---|---|---|---|---|---|
| BET surface area | 11 | 12 | 6 | 9 | 8 |
| Langmuir surface area | 16 | 17 | 14 | 13 | 12 |
| Crystalline form | rutile | rutile | rutile | anatase | anatase |
| Refractive index | 2.75 | 2.75 | 2.75 | 2.55 | 2.55 |

-continued

|  | D1 | D2 | D3 | D/1 comp | D/2 comp |
|---|---|---|---|---|---|
| Surface | uneven | uneven | uneven | smooth | smooth |
| Commercially available product | TiO$_2$ Kronos 2220 | TiO$_2$ Kronos 2222 | Sachtleben R330 | TiO$_2$ Kronos 1071 | Sachtleben LW-S |

Component E:
Ethylene copolymer: 59.8% by weight of ethylene
35% by weight of n-butyl acrylate
4.5% by weight of acrylic acid
0.7% by weight of maleic anhydride
Component F/1:
Standard chopped glass fiber for polyamides, length=4.5 mm, diameter=10 μm.
Component F/2:
N,N'-hexamethylenebis-3,5-di-tert-butyl-4-hydroxyhydrocinnamide (Irganox® 1098)
Component F/3:
Ca stearate
Component F/4:
Zinc oxide In order to demonstrate the improvements described in the invention, appropriate plastics molding compositions were prepared by compounding. For this, the individual components were mixed at 15 kg/h throughput and at about 290° C. with a flat temperature profile in a ZSK 25 (Berstorff) twin-screw extruder, discharged in the form of a strand, cooled until pelletizable, and pelletized.

The fire protection tests were carried out as follows:
UL 94 after aging for 2 d at 23° C. or 7 d (days) at 70° C. in air.

The constitutions of the molding compositions and the results of the tests are given in the table. In each case, total content of F/2/F/3, and F4 was 1.5% by weight.

| Components [% by wt.] | 1 | 2 | 3 | comp 1 | comp 2 |
|---|---|---|---|---|---|
| A | 36.75 | 36.75 | 36.75 | 36.75 | 36.75 |
| F/1 | 25 | 25 | 25 | 25 | 25 |
| D/1 | 12.5 |  |  |  |  |
| D/2 |  | 12.5 |  |  |  |
| D/3 |  |  | 12.5 |  |  |
| D/1 comp |  |  |  | 12.5 |  |
| D/2 comp |  |  |  |  | 12.5 |
| B | 1.75 | 1.75 | 1.75 | 1.75 | 1.75 |
| C | 12.5 | 12.5 | 12.5 | 12.5 | 12.5 |
| E | 10 | 10 | 10 | 10 | 10 |
| UL 94 0.8 mm 2d/23° C. |  |  |  |  |  |
| Classification | V-0 | V-0 | V-0 | V-0 | V-0 |
| Total afterflame time [s] | 32 | 27 | 31 | 42 | 39 |
| Ignition of cotton pad under specimen | no | no | no | no | no |
| UL 94 0.8 mm 7 d/70° C. |  |  |  |  |  |
| Classification | V-0 | V-0 | V-0 | V-2 | V-2 |
| Total afterflame time [s] | 38 | 41 | 45 | 32 | 37 |
| Ignition of cotton pad under specimen | no | no | no | yes | yes |

The invention claimed is:
1. A thermoplastic molding composition comprising
A) from 10 to 98% by weight of a thermoplastic polyamide,
B) from 0.1 to 60% by weight of red phosphorus,
C) from 0.5 to 20% by weight of a melamine compound,
D) from 1 to 30% by weight of titanium dioxide in the rutile form,

E) from 0 to 40% by weight of an impact modifier, and
F) from 0 to 60% by weight of further additives,
where the sum of the percentages by weight of components A) to F) does not exceed 100%.

2. The thermoplastic molding composition according to claim 1, comprising
A) from 20 to 96% by weight of the thermoplastic polyamide,
B) from 0.5 to 40% by weight of the red phosphorus,
C) from 1 to 20% by weight of the melamine compound,
D) from 1 to 25% by weight of the titanium dioxide,
E) from 1 to 30% by weight of the impact modifier, and
F) from 0 to 50% by weight of the further additives.

3. The thermoplastic molding composition according to claim 1, in which component C) is composed of melamine polyphosphate or of melamine polyphosphate salts derived from a 1,3,5-triazine compound, or of a mixture of these.

4. The thermoplastic molding composition according to claim 1, in which component D) has an uneven surface.

5. The thermoplastic molding composition according to claim 1, in which the refractive index of component D) is n=2.75 (in accordance with DIN 51423).

6. The thermoplastic molding composition according to claim 1, in which the BET surface area of component D) in accordance with DIN ISO 9277 is at least 5 m²/g.

7. The thermoplastic molding composition according to claim 1, in which the Langmuir surface area of component D) is at least 14 m²/g (in accordance with DIN 66131 and 66134).

8. The thermoplastic molding composition according to claim 1, in which component E) is composed of an ethylene copolymer which comprises from 0.1 to 20% by weight of functional monomers.

9. The thermoplastic molding composition according to claim 1, where component E) comprises functional monomers selected from the group of the carboxylic acid, carboxylic anhydride, carboxamide, carboximide, amino, hydroxy, epoxy, urethane, or oxazoline groups, or a mixture of these.

10. A process wherein the thermoplastic molding compositions according to claim 1 undergoes a process for producing fibers, foils, and moldings.

11. A fiber, foil, or molding obtainable from the thermoplastic molding compositions according to claim 1.

12. A thermoplastic molding composition comprising
A) from 10 to 98% by weight of a thermoplastic polyamide,
B) from 0.1 to 60% by weight of red phosphorus,
C) from 0.5 to 20% by weight of a melamine compound,
D) from 1 to 30% by weight of titanium dioxide in the rutile form,
E) from 0 to 40% by weight of an impact modifier, and
F) from 0 to 60% by weight of further additives,
where the sum of the percentages by weight of components A) to F) does not exceed 100%;
in which the Langmuir surface area of component D) is at least 14 m²/g (in accordance with DIN 66131 and 66134).

* * * * *